United States Patent
Shibayama et al.

(10) Patent No.: US 9,851,247 B2
(45) Date of Patent: *Dec. 26, 2017

(54) SPECTROMETER MODULE

(71) Applicant: HAMAMATSU PHOTONICS K.K., Hamamatsu-shi, Shizuoka (JP)

(72) Inventors: Katsumi Shibayama, Hamamatsu (JP); Takafumi Yokino, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,356

(22) Filed: Feb. 12, 2016

(65) Prior Publication Data

US 2016/0161334 A1    Jun. 9, 2016

Related U.S. Application Data

(63) Continuation of application No. 13/637,410, filed as application No. PCT/JP2011/056286 on Mar. 16, 2011, now Pat. No. 9,285,270.

(30) Foreign Application Priority Data

Apr. 1, 2010    (JP) ................................ 2010-085204

(51) Int. Cl.
    *G01J 3/28*         (2006.01)
    *G01J 3/02*         (2006.01)
    (Continued)

(52) U.S. Cl.
    CPC ................ *G01J 3/021* (2013.01); *G01J 3/02* (2013.01); *G01J 3/0202* (2013.01);
    (Continued)

(58) Field of Classification Search
    CPC ........ G01J 3/021; G01J 3/0208; G01J 3/0243; G01J 3/20; G01N 2201/065; G02B 6/29308
    See application file for complete search history.

(56) References Cited

U.S. PATENT DOCUMENTS

| | | | |
|---|---|---|---|
| 4,571,074 | A | 2/1986 | Thevenon |
| 5,371,813 | A | 12/1994 | Artigue |

(Continued)

FOREIGN PATENT DOCUMENTS

| | | |
|---|---|---|
| CN | 101014841 | 8/2007 |
| CN | 101216595 | 7/2008 |

(Continued)

OTHER PUBLICATIONS

U.S. Office Action dated Oct. 9. 2014 that issued in U.S. Appl. No. 13/637,408 including Double Patenting Rejections on pp. 2-3.

(Continued)

*Primary Examiner* — Michael A Lyons
*Assistant Examiner* — Maurice Smith
(74) *Attorney, Agent, or Firm* — Drinker Biddle & Reath LLP

(57) ABSTRACT

A spectroscopic module 1 is provided with a spectroscopic unit 8 and a photodetector 9 in addition to a spectroscopic unit 7 and a photodetector 4 and thus can enhance its detection sensitivity for light in a wide wavelength range or different wavelength regions of light. A light-transmitting hole 4b is disposed between light detecting portions 4a, 9a, while a reflection unit 6 is provided so as to oppose a region R in a light-absorbing substrate 2, whereby the size can be kept from becoming larger. Ambient light La is absorbed by the region R in the substrate 2. Any part of the light La transmitted through the region R in the substrate 2 is reflected to the region R by the unit 6 formed so as to oppose (Continued)

the region R, whereby stray light can be inhibited from being caused by the incidence of the light La.

14 Claims, 9 Drawing Sheets

(51) Int. Cl.
*G01J 3/18* (2006.01)
*G01J 3/36* (2006.01)

(52) U.S. Cl.
CPC ........... *G01J 3/0256* (2013.01); *G01J 3/0262* (2013.01); *G01J 3/0291* (2013.01); *G01J 3/18* (2013.01); *G01J 3/36* (2013.01)

(56) References Cited

U.S. PATENT DOCUMENTS

| | | | |
|---|---|---|---|
| 6,614,528 B1 | 9/2003 | Bohle | |
| 7,733,492 B1 | 6/2010 | Szarmes et al. | |
| 7,852,474 B2 | 12/2010 | Dobschal et al. | |
| 8,013,993 B2 | 9/2011 | Shibayama et al. | |
| 8,045,155 B2 | 10/2011 | Suzuki et al. | |
| 2007/0242268 A1 | 10/2007 | Dobschal et al. | |
| 2007/0252989 A1* | 11/2007 | Comstock | G01J 3/02 356/328 |
| 2010/0177308 A1 | 7/2010 | Bohle et al. | |

FOREIGN PATENT DOCUMENTS

| | | | |
|---|---|---|---|
| DE | 101 37 428 | 2/2003 | |
| DE | 2287479 A1 * | 2/2011 | ............... G01J 3/18 |
| EP | 2287579 A1 | 2/2011 | |
| JP | 3-39572 | 6/1991 | |
| JP | 4-294223 | 10/1992 | |
| JP | 2000-171300 | 6/2000 | |
| JP | 2009-92680 | 4/2009 | |
| JP | 2009-300414 | 12/2009 | |
| JP | 2009-300420 | 12/2009 | |
| JP | 2009-300424 | 12/2009 | |

OTHER PUBLICATIONS

Combining MEMS Technology with Image Sensor Technology Newly Developed "Thumb Sized" Ultra-Compact Spectroscope Started Shipping Samples of MS Series "C10988MA(X)", New Release, Hamamatsu Photonics K.K., URL: https://jp.hamamatsu.com/hamamatsu/press/2008/common/pdf/2008_08_28.pdf, Aug. 28, 2008, pp. 1-4 (with partial English-language translation attached).
English-language translation of International Preliminary Report on Patentability (IPRP) dated Nov. 22, 2013 that issued in WO Patent Application No. PCT/JP2011/056247.
English-language translation of International Preliminary Report on Patentability (IPRP) dated Nov. 22, 2012 that issued in WO Patent Application No. PCT/JP2011/056286.

* cited by examiner (a)

(b)

(a)

(b)

(a)

(b)

SPECTROMETER MODULE

This is a continuation application of copending application Ser. No. 13/637,410, having a §371 date of Oct. 31, 2012, which is a national stage filing based on PCT International Application No. PCT/JP2011/056286, filed on Mar. 16, 2011. The copending application Ser. No. 13/637,410 is incorporated by reference herein in its entirety.

TECHNICAL FIELD

The present invention relates to a spectroscopic module which disperses and detects light.

BACKGROUND ART

Known as a conventional spectroscopic module is one comprising a block-shaped support defining a biconvex lens having a first convex surface provided with a spectroscopic unit such as a blazed diffraction grating and a second convex surface provided with a photodetector such as a photodiode (see, for example, Patent Literature 1). In such a spectroscopic module, light incident on the second convex surface is dispersed by the spectroscopic unit, and thus dispersed light is detected by the photodetector.

CITATION LIST

Patent Literature

Patent Literature 1: Japanese Patent Application Laid-Open No. 4-294223

SUMMARY OF INVENTION

Technical Problem

The above-mentioned spectroscopic module can be made smaller but is hard to enhance its detection sensitivity for light having a wide wavelength range or different wavelength regions of light. This is because the blazed diffraction grating characteristically exhibits a high efficiency for light in a specific wavelength region.

In view of such circumstances, it is an object of the present invention to provide a spectroscopic module which can accurately detect light in a wide wavelength range or different wavelength regions of light while being prevented from becoming larger in size.

Solution to Problem

For achieving the above-mentioned object, the spectroscopic module in accordance with the present invention comprises a main unit provided with a depressed portion having a concave curved surface and opening to one side; a first spectroscopic unit, formed on the curved surface, for dispersing light incident on the depressed portion and reflecting the light to the one side of the main unit; a first photodetector, supported so as to oppose the curved surface, for detecting a first light having a first order diffraction light and dispersed by the first spectroscopic unit; a reflection unit for reflecting a second light having a second order diffraction light and dispersed by the first spectroscopic unit; a second spectroscopic unit, formed on the curved surface, for dispersing the second light reflected by the reflection unit and reflecting the second light to the one side of the main unit; and a second photodetector, supported so as to oppose the curved surface, for detecting a third light dispersed by the second spectroscopic unit; wherein, on the one side of the main unit, a light entrance portion for letting the light into the depressed portion and a light-absorbing layer for absorbing the light are disposed between a first light detecting portion of the first photodetector and a second light detecting portion of the second photodetector; and wherein the reflection unit is located closer to the first and second spectroscopic units than are the first and second light detecting portions and the light-absorbing layer and opposes the light-absorbing layer.

In this spectroscopic module, light incident on the depressed portion unit is dispersed and reflected to one side of the main unit by the first spectroscopic unit. In the light dispersed by the first spectroscopic unit, the first light advances to the one side of the main unit and is detected by the first photodetector. In the light dispersed by the first spectroscopic unit, the second light advances to the one side of the main unit and is reflected to the other side of the main unit by the reflection unit. The second light reflected by the reflection unit is dispersed and reflected to the one side of the main unit by the second spectroscopic unit. In the light dispersed by the second spectroscopic unit, the third light advances to the one side of the main unit and is detected by the second photodetector. Since the second spectroscopic unit and second photodetector are thus provided in addition to the first spectroscopic unit and first photodetector, the detection sensitivity can be enhanced for light in a wide wavelength range or different wavelength regions of light. Further, the light entrance portion and the light-absorbing layer are provided between the first light detecting portion of the first photodetector and the second light detecting portion of the second photodetector, while the reflection unit is disposed so as to oppose the light-absorbing layer. Thus using a region between the first and second light detecting portions can prevent the spectroscopic module from becoming larger in size. When light is let into the depressed portion from the light entrance portion, ambient light, which is likely to reach the light entrance portion, is absorbed by the light-absorbing layer. Any part of ambient light transmitted through the light-absorbing layer is reflected to the light-absorbing layer by the reflection unit disposed so as to oppose the light-absorbing layer. This can inhibit stray light from being caused by the incidence of ambient light. Because of the foregoing, the present invention makes it possible to accurately detect light in a wide wavelength range or different wavelength regions of light, while preventing the size from becoming larger.

Preferably, a region between the first and second photodetectors in the light-absorbing layer is included in the reflection unit when seen from the one side of the main unit. In this structure, a part of the ambient light transmitted through the light-absorbing layer can be reflected more reliably to the light-absorbing layer.

Preferably, the spectroscopic module further comprises a substrate arranged on the one side of the main unit so as to cover the depressed portion, the first and second photodetectors are disposed on one surface of the substrate, and the reflection unit is disposed on the other surface of the substrate. In this structure, the reflection unit can be formed easily and accurately at a position, closer to the first and second spectroscopic units than is the light-absorbing layer, opposing the light-absorbing layer. When being provided on the other surface of the substrate, the reflection unit may be required to be formed as a multilayer structure including a reflection layer having a favorable reflection characteristic and a foundation layer compatible with the substrate. Here, the reflection unit is provided by forming the foundation layer on the other surface of the substrate and forming the reflection layer on the foundation layer, and the substrate and the main unit are joined to each other such that the reflection unit opposes the concave curved surface. This allows the reflection layer to face the first and second spectroscopic units, whereby the second light can be reflected reliably.

Advantageous Effects of Invention

The present invention can provide a spectroscopic module which can accurately detect light in a wide wavelength range or different wavelength regions of light while being prevented from becoming larger in size.

DESCRIPTION OF EMBODIMENTS

Figure 1:
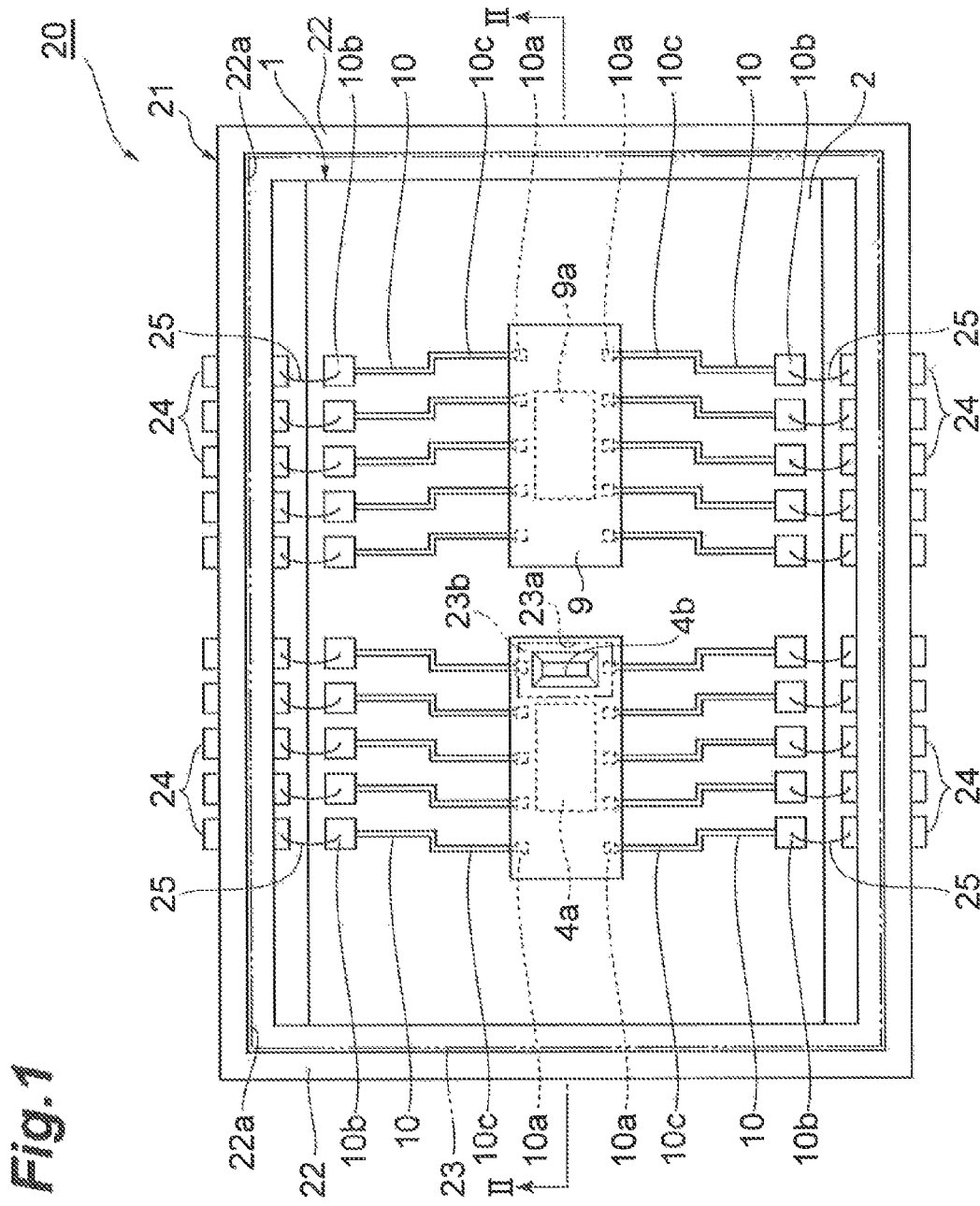
FIG. 1 is a plan view of a spectroscope in which a first embodiment of the spectroscopic module in accordance with the present invention is employed.

In the following, preferred embodiments of the present invention will be explained in detail with reference to the drawings. In the drawings, the same or equivalent parts will be referred to with the same signs while omitting their overlapping descriptions.

First Embodiment

As illustrated in FIG. 1, a spectroscope 20 comprises a spectroscopic module 1 and a package 21 for accommodating the spectroscopic module 1. The package 21 has a box 22 shaped like a rectangular parallelepiped box and a lid 23 formed into an oblong sheet. The box 22 and lid 23 are made of a light-absorbing material such as a resin or ceramic which absorbs light. The lid 23 is formed with a light entrance hole 23a for letting light into the box 22 from the outside, while a light entrance aperture plate 23b which transmits light therethrough is secured to the light entrance hole 23a. The box 22 opens to the front side, while its opening is formed with a depressed portion 22a having an oblong cross section into which the lid 23 fits, A plurality of leads 24 are embedded in both side faces parallel to the longitudinal direction of the box 22. Base end parts of the leads 24 are exposed into the box 22, while their leading end parts extend to the outside of the box 22.

Figure 2:
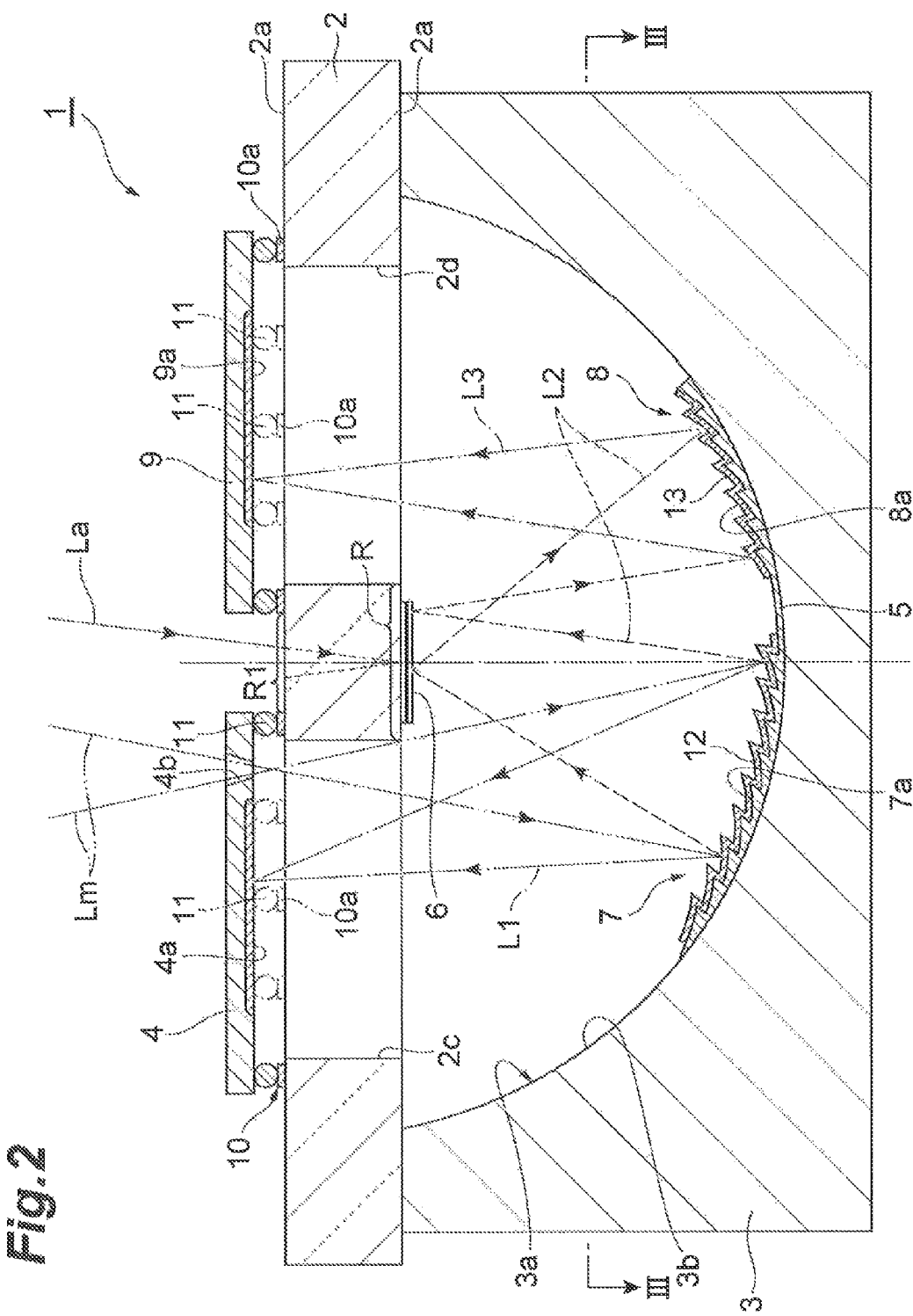
FIG. 2 is a sectional view of the spectroscopic module taken along the line II-II of FIG. 1.

As illustrated in FIGS. 1 and 2, the spectroscopic module 1 comprises a rectangular parallelepiped main unit 3 including a semispherical depressed portion 3a having a concave curved surface 3b and opening to the front side (one side), a substrate (light-absorbing layer) 2 arranged on the front side of the main unit 3 so as to cover the depressed portion 3a, a spectroscopic unit (first spectroscopic unit) 7 which disperses light Lm incident on the depressed portion 3a through the substrate 2 and reflects it to the front side, and a photodetector (first photodetector) 4 which detects a light component (first light having a first order diffraction light) L1 which is the −1st-order light dispersed by the spectroscopic unit 7. The spectroscopic module 1 also comprises a reflection unit 6 which reflects a light component (second light having a second order diffraction light) L2 which is the zero-order light dispersed by the spectroscopic unit 7 to the rear side (the other side), a spectroscopic unit 8 which disperses the light L2 reflected by the reflection unit 6 and reflects it to the front side, and a photodetector (second photodetector) 9 which detects a light component (third light) L3 dispersed by the spectroscopic unit 8.

The substrate 2 is constituted by any of light-absorbing materials such as black resists, colored resins (such as silicone, epoxy, acrylic, urethane, polyimide, and composite resins) containing fillers (such as carbon and oxides) therein, metals such as Cr and Co or oxides thereof, their multilayer films, and porous ceramics and metals or metal oxides, for example, and has openings 2c, 2d. The opening 2c is located on one side in the longitudinal direction of the substrate 2, while the opening 2d is located on the other side in the longitudinal direction of the substrate 2. The opening 2c is a hole through which the light Lm incident on the depressed portion 3a of the main unit 3 and the light L1 dispersed by the spectroscopic unit 7 pass. The opening 2c is a hole through which the light L3 dispersed by the spectroscopic unit 8 passes.

A wiring pattern 10 constituted by a single-layer film of Al, Au, or the like or a multilayer films of Cr—Pt—Au, Ti—Pt—Au, Ti—Ni—Au, Cr—Au, or the like is formed on the front face (one face) 2a of the substrate 2. The wiring pattern 10 includes a plurality of pad units 10a, a plurality of pad units 10b, and a plurality of connection units 10c for connecting the corresponding pad units 10a, 10b to each other. The plurality of pad units 10b are arranged such as to correspond to the base end parts of the leads 24 embedded in the box 22. An antireflection layer constituted by a single-layer film of CrO and the like or a multilayer film of Cr—CrO and the like is formed closer to the front face 2a of the substrate 2 than is the wiring pattern 10.

Outer terminals of the oblong-sheet-shaped photodetectors 4, 9 are connected to their corresponding pad units 10a by facedown bonding through bumps 11. The photodetector 4 is located on one side in the longitudinal direction of the substrate 2 such that its light detecting portion 4a opposes the opening 2c of the substrate 2. The photodetector 9 is located on the other side in the longitudinal direction of the substrate 2 such that its light detecting portion 9a opposes the opening 2d of the substrate 2. An underfill material is applied between the photodiodes 4, 9 and the front face 2a of the substrate 2 so as to cover the pad units 10a and the bumps 11.

The light detecting portion 4a of the photodetector 4 is constructed by one-dimensionally arranging elongated photodiodes in a direction substantially perpendicular to their longitudinal direction. The photodetector 4 is arranged such that the one-dimensional arrangement direction of photodiodes substantially coincides with the longitudinal direction of the substrate 2 while the light detecting portion 4a is oriented to the front face 2a of the substrate 2. The photodetector 4 is not restricted to the photodiode array, but may be a CMOS image sensor, a CCD-image sensor, or the like.

The photodetector 4 is provided with a light-transmitting hole (light entrance portion) 4b through which the light Lm incident on the depressed portion 3a of the main unit 3 passes. The light-transmitting hole 4b is located on the other side in the longitudinal direction of the substrate 2 and opposes the opening 2c of the substrate 2. The light-transmitting hole 4b, which is a slit extending in a direction substantially perpendicular to the longitudinal direction of the substrate 2 and substantially parallel to the front face 2a of the substrate 2, is formed by etching or the like while being positioned highly accurately with respect to the light detecting portion 4a.

As with the light detecting portion 4a of the photodetector 4, the light detecting portion 9a of the photodetector 9 is constructed by one-dimensionally arranging elongated photodiodes in a direction substantially perpendicular to their longitudinal direction. The photodetector 9 is arranged such that the one-dimensional arrangement direction of photodiodes substantially coincides with the longitudinal direction of the substrate 2 while the light detecting portion 9a is oriented to the front face 2a of the substrate 2. As with the photodetector 4, the photodetector 9 is not restricted to the photodiode array, but may be a C-MOS image sensor, a CCD-image sensor, or the like.

The pad units 10b function as outer terminals of the spectroscopic module 1. That is, the pad units 10b are electrically connected to the base end parts of their corresponding leads 24 with respective wires 25. As a consequence, an electric signal generated when the light detecting portion 4a of the photodetector 4 receives the light L1 is taken out of the spectroscope 20 through the bumps 11, wiring pattern 10, wires 25, and leads 24 on the photodetector 4 side. Similarly, an electric signal generated when the light detecting portion 9a of the photodetector 9 receives the light L3 is taken out of the spectroscope 20 through the bumps 11, wiring pattern 10, wires 25, and leads 24 on the photodetector 9 side.

As illustrated in FIG. 2, the rectangular parallelepiped main unit 3 is joined to the rear face (other surface) 2b of the substrate 2. The main unit 3 is constituted by a light-shielding or light-absorbing resin, examples of which include liquid-crystalline fully aromatic polyester resins, polycarbonate, and black epoxy. The curved surface 3b of the depressed portion 3a covered with the substrate 2 may also be aspheric.

Figure 3:
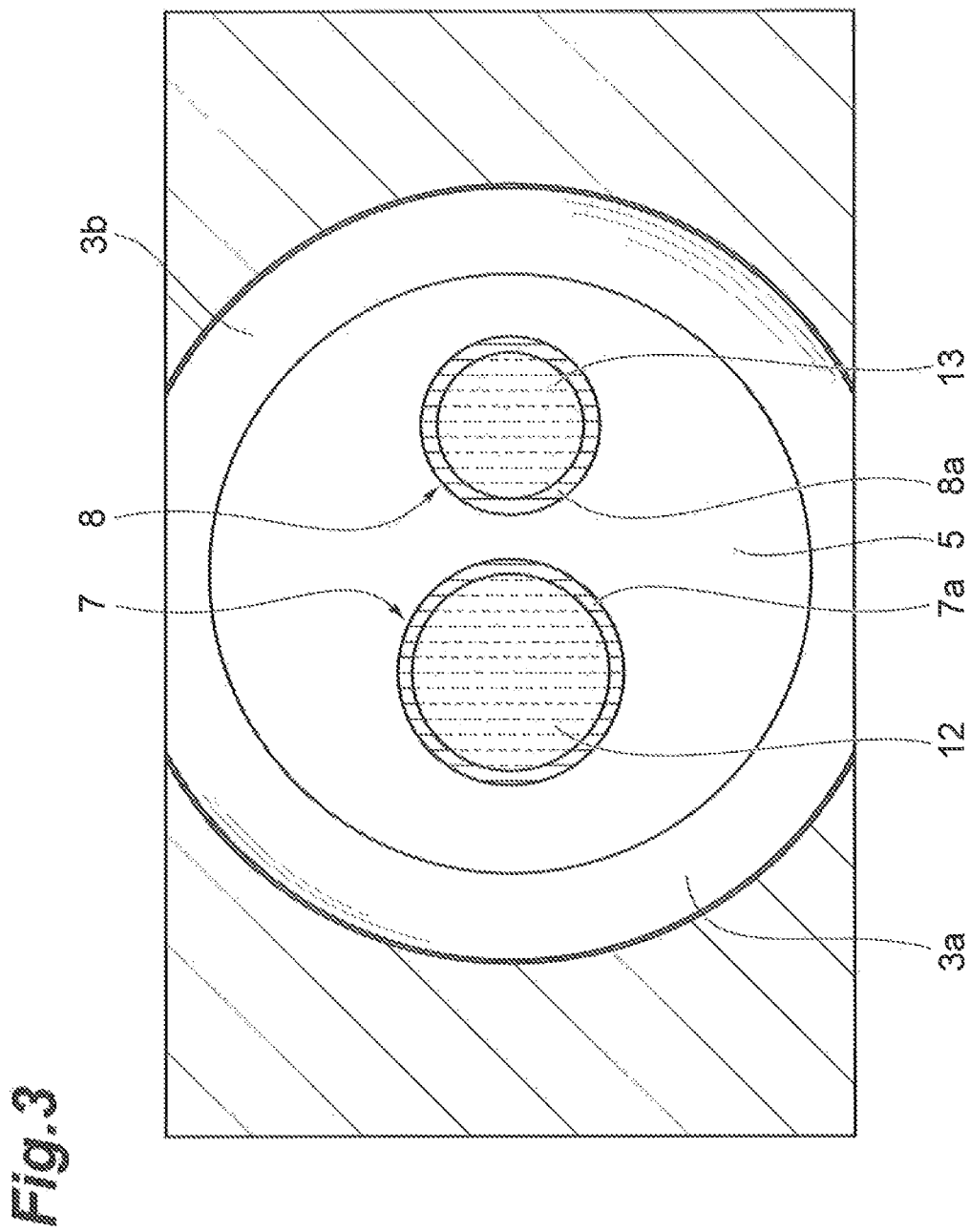
FIG. 3 is a sectional view taken along the line III-III of FIG. 2.
Figure 4:
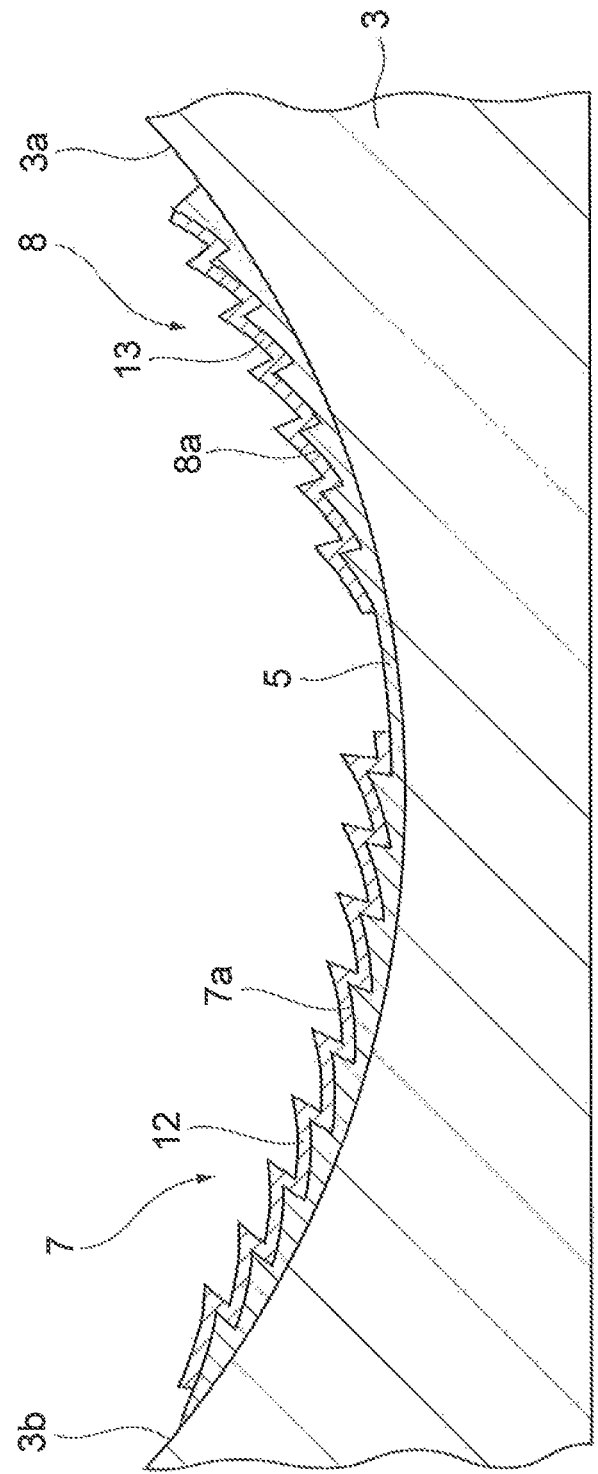
FIG. 4 is a sectional view enlarging a main part of the spectroscopic module of FIG. 2.

As illustrated in FIGS. 2 to 4, the spectroscopic units 7, 8 are disposed near the bottom of the curved surface 3b of the depressed portion 3a. The spectroscopic unit 7 is located on one side in the longitudinal direction of the substrate 2 so as to oppose the photodetector 4. The spectroscopic unit 8 is located on the other side in the longitudinal direction of the substrate 2 so as to oppose the photodetector 9. The spectroscopic unit 7 has a diffraction grating pattern 7a formed on a diffraction layer 5 and a reflection layer 12 formed so as to cover the diffraction grating pattern 7a. Similarly, the spectroscopic unit 8 has a diffraction grating pattern 8a formed on the diffraction layer 5 and a reflection layer 13 formed so as to cover the diffraction grating pattern 8a.

The diffraction layer 5 is formed into a circle when seen from the front side. The reflection layers 12, 13, each formed into a circle when seen from the front side, are included in respective regions formed with their corresponding diffraction grating patterns 7a, 8a.

The diffraction layer 5 is formed like a film in conformity to the curved surface 3b of the depressed portion 3a. The diffraction layer 5 is provided by photocuring any of optical resins for a replica such as photocurable epoxy resins, acrylic resins, fluorine-based resins, PMMA, silicone, and organic/inorganic hybrid resins. The diffraction grating patterns 7a, 8a, each of which is a blazed grading having a sawtooth cross section, are constructed by juxtaposing a plurality of grooves along the longitudinal direction of the substrate 2. The reflection layers 12, 13 are formed into films by vapor-depositing Al or Au, for example.

As illustrated in FIG. 2, the reflection unit 6 is disposed on the rear face 2b of the substrate 2 so as to oppose the curved surface 3b of the depressed portion 3a. As a consequence, the reflection unit 6 is located on the rear side of (i.e., on the side closer to the spectroscopic units 7, 8 than are) the light detecting portion 4a of the photodetector 4, the light detecting portion 9a of the photodetector 9, and the substrate 2, The reflection unit 6 opposes a region R between the light detecting portions 4a, 9a in the substrate 2 and includes a region R1 between the photodetectors 4, 9 in the substrate 2 (i.e., a part of the substrate 2 exposed to the front side through a gap between the photodetectors 4, 9) when seen from the front side.

In thus constructed spectroscopic module 1, the light Lm incident on the depressed portion 3a from the light-transmitting hole 4b of the photodetector 4 through the opening 2c of the substrate 2 is dispersed and reflected to the front side by the spectroscopic unit 7. In the light Lm dispersed by the spectroscopic unit 7, the light L1 advances to the front side and is detected by the photodetector 4. In the light dispersed by the spectroscopic unit 7, the light L2 advances to the front side and is reflected to the rear side by the reflection unit 6. The light L2 reflected by the reflection unit 6 is dispersed and reflected to the front side by the spectroscopic unit 8. In the light dispersed by the spectroscopic unit 8, the light L3 advances to the front side and is detected by the photodetector 9. Since the spectroscopic unit 8 and the photodetector 9 are thus provided in addition to the spectroscopic unit 7 and the photodetector 4, the detection sensitivity can be enhanced for light in a wide wavelength range or different wavelength regions of light, so as to widen the detectable wavelength range.

The light-transmitting hole 4b is disposed between the light detecting portions 4a, 9a of the photodetectors 4, 9, while the reflection unit 6 is provided so as to oppose the region R in the substrate 2. Thus using the region between the light detecting portions 4a, 9a can prevent the spectroscopic module 1 from becoming larger.

Ambient light La, which is likely to reach the light-transmitting hole 4b and thereabout when the light Lm is made incident on the depressed portion 3a from the light-transmitting hole 4b, is absorbed in the region R in the substrate 2. Any part of the ambient light La transmitted through the region R in the substrate 2 is reliably reflected to the region R in the substrate 2 by the reflection unit 6 disposed so as to oppose the region R in the substrate 2 and include the region R1 thereof. This can inhibit stray light from being caused by the incidence of the ambient light La.

Any part of the ambient light La (a long wavelength light component in particular) entering the depression 3a through the region R in the substrate 2 constituted by a light-absorbing material becomes a part of stray light and increases the stray light unnecessary for spectrometer characteristics. The laser light L2 mostly has a light intensity not so higher than that of the light L1, whereby the light L3, which is a diffracted light of the light L2, further lowers its light intensity. That is, the lights L2, L3 are highly susceptible to the stray light caused by the ambient light La. Providing the reflection unit 6 as mentioned above is extremely effective in mitigating such a state.

Because of the foregoing, the spectroscopic module 1 can accurately detect light in a wide wavelength range or different wavelength regions of light, while being prevented from becoming larger.

A method of manufacturing the above-mentioned spectroscopic module 1 will now be explained.

Figure 5:
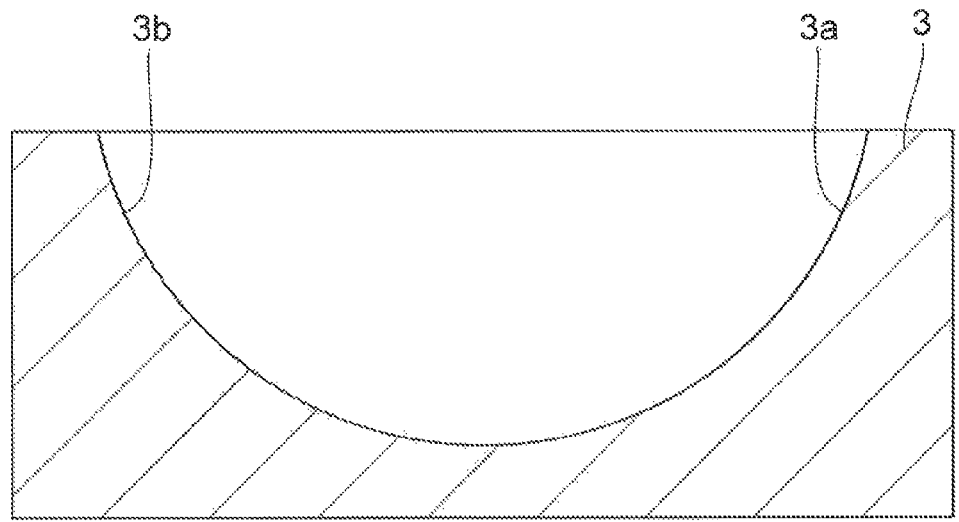
FIG. 5 is a sectional view for explaining a manufacturing process of the spectroscopic module of FIG. 2.
Figure 5:
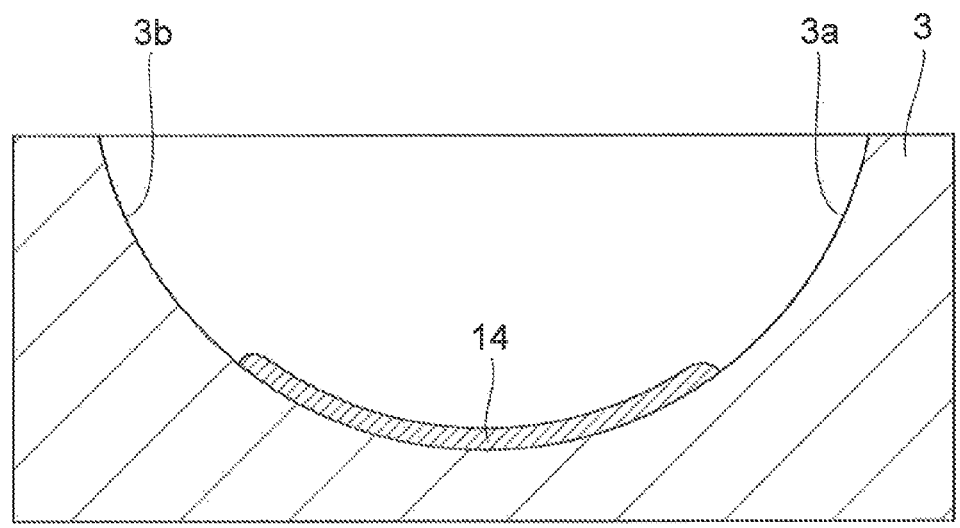
Figure 6:
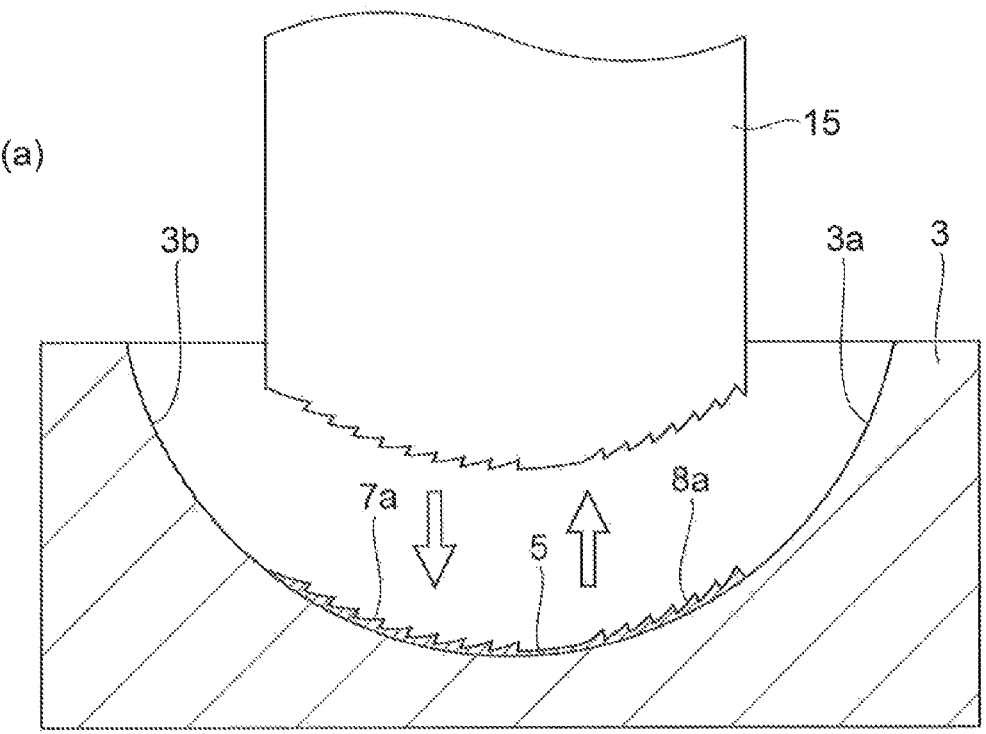
FIG. 6 is a sectional view for explaining the manufacturing process of the spectroscopic module of FIG. 2.
Figure 6:
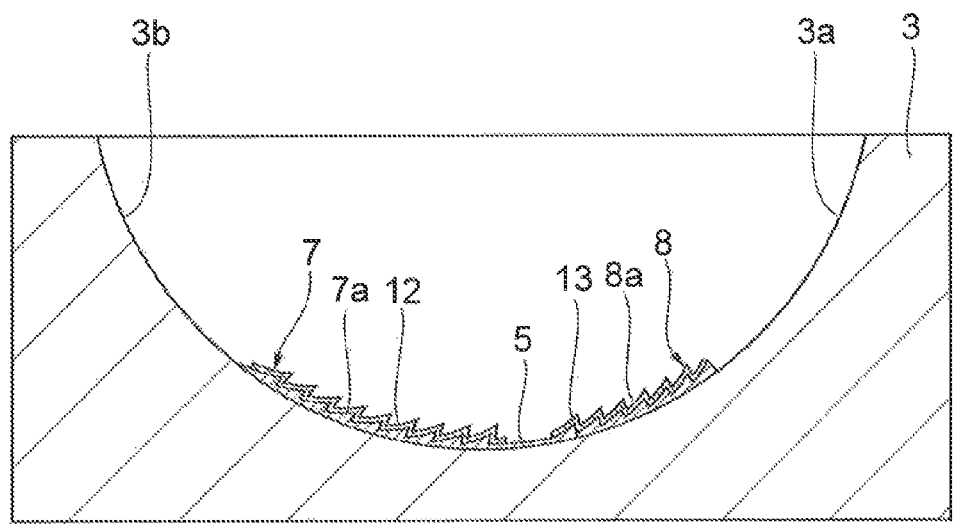

First, as illustrated in FIG. 5(a), the main unit 3 having the depressed portion 3a is molded from a resin. Subsequently, as illustrated in FIG. 5(b), the photocurable resin material 14 is applied to the bottom of the curved surface 3b of the depressed portion 3a and thereabout. Then, as illustrated in FIG. 6(a), a master grating 15 which is a die for forming the diffraction grating patterns 7a, 8a is pressed against the applied resin material 14, while the resin material 14 is hardened by irradiation with light, so as to provide the diffraction layer 5 formed with the diffraction grating patterns 7a, 8a. Here, when necessary, the diffraction layer 5 may be heat-treated, so as to be reinforced. A thermosetting resin may also be used as the resin material 14, so as to form the diffraction layer 5 and the like by heat and pressure application alone. Further, as illustrated in FIG. 6(b), Al, Au, or the like is vapor-deposited so as to cover the diffraction grating patterns 7a, 8a, thereby forming the reflection layers 12, 13. This forms the spectroscopic units 7, 8.

Figure 7:
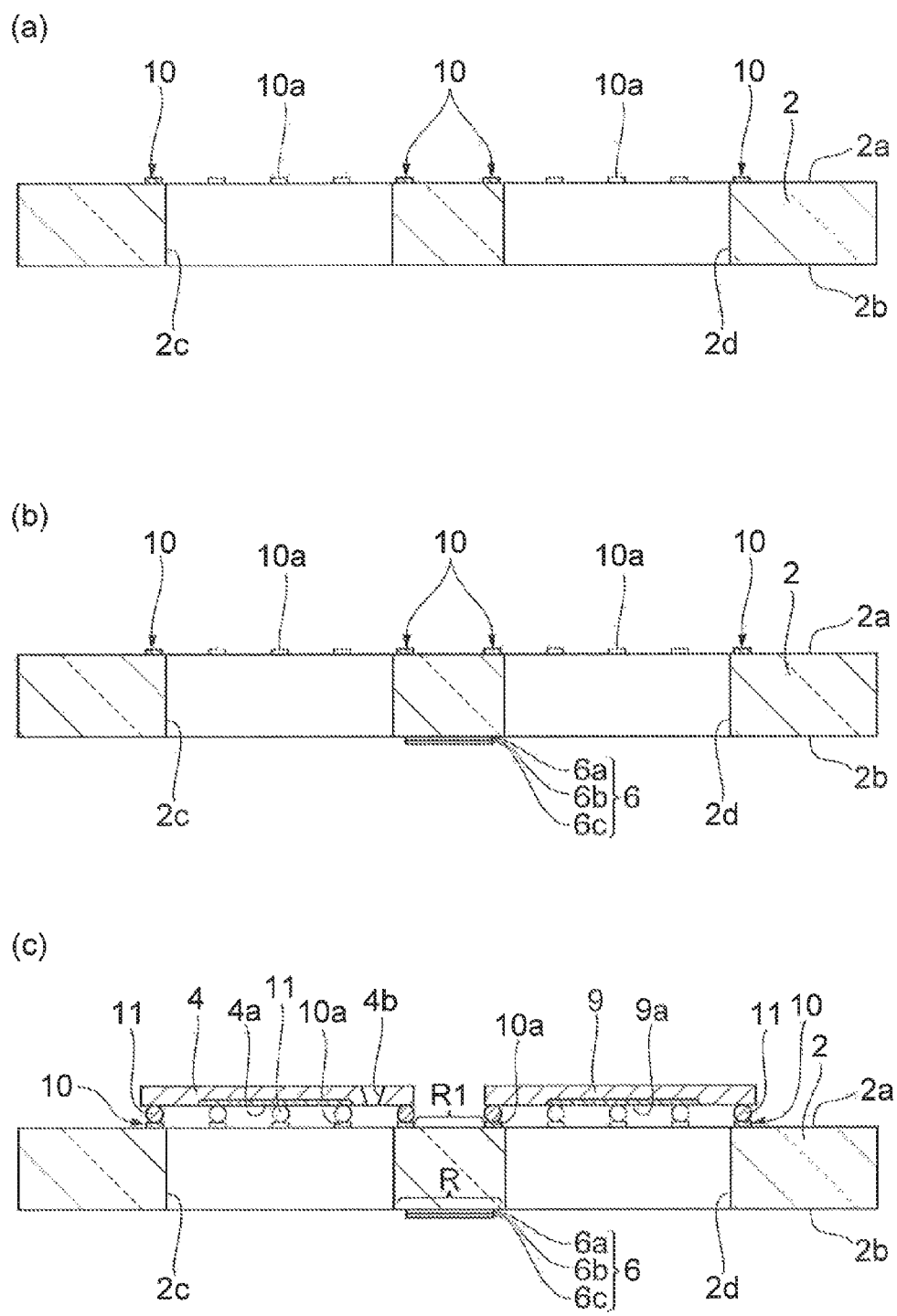
FIG. 7 is a sectional view for explaining the manufacturing process of the spectroscopic module of FIG. 2.

On the other hand, as illustrated in FIG. 7(a), the wiring pattern 10 is formed on the front face 2a of the substrate 2 having the openings 2c, 2d. Subsequently, as illustrated in FIG. 7(b), a foundation layer 6a, an intermediate layer 6b, and a reflection layer 6c are stacked on the rear face 2b of the substrate 2, so as to form the reflection unit 6 constituted by a multilayer structure. An example of the multilayer structure of the reflection unit 6 comprises the foundation layer 6a made of Ti or Cr, the intermediate layer 6b made of Pt, and the reflection layer 6c made of Au. Thereafter, as illustrated in FIG. 7(c), the photodetector 4 is mounted on its corresponding pad units 10a of the wiring pattern 10 by facedown bonding through the bumps 11 such that the light detecting portion 4a and light-transmitting hole 4b oppose the opening 2c of the substrate 2. Similarly, the photodetector 9 is mounted on its corresponding pad units 10a of the wiring pattern 10 by facedown bonding through the bumps 11 such that the light detecting portion 9a opposes the opening 2d of the substrate 2.

The reflection layer 6c is not limited to the Au layer, but may be a layer made of a high-reflectance metal film or metal oxide film based on Al or the like. The reflection unit 6 may also be formed by a dielectric multilayer mirror. As these materials, those having a high reflectance are selected according to wavelengths to be dealt with by the spectroscopic module.

Finally, the substrate 2 mounted with the photodetectors 4, 9 is joined to the main unit 3 so as to cover the depressed portion 3a, whereby the spectroscopic module 1 is obtained as illustrated in FIG. 2.

As explained in the foregoing, the reflection unit 6 is disposed on the rear face 2b of the substrate 2 in the method of manufacturing the spectroscopic module 1. This makes it possible to form the reflection unit 6 easily and accurately at a position, closer to the spectroscopic units 7, 8 than are the light detecting portions 4a, 9a of the photodetectors 4, 9 and the substrate 2, opposing the region R in the substrate 2. The reflection unit 6 is also provided by forming the foundation layer 6a on the rear face 2b of the substrate 2 and forming the reflection layer 6c on the foundation layer 7a. This allows the reflection layer 6c to face the spectroscopic units 7, 8, whereby the light L2 can be reflected reliably.

Second Embodiment

Figure 8:
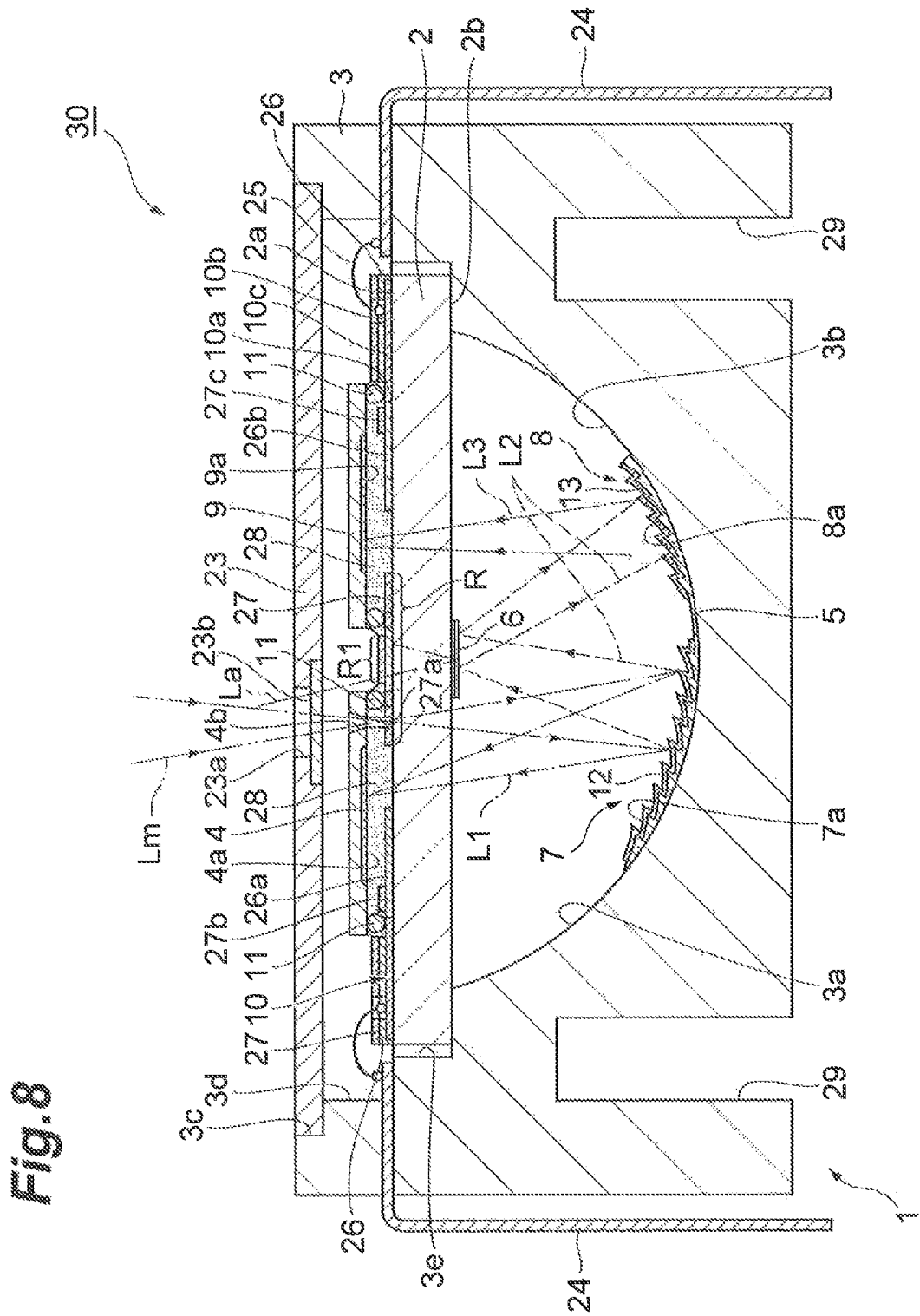
FIG. 8 is a plan view of a spectroscope in which a second embodiment of the spectroscopic module in accordance with the present invention is employed.

As illustrated in FIG. 8, in a spectroscopic module 1 in a spectroscope 30, a main unit 3 is formed with a depressed portion 3c having an oblong cross section into which a lid 23 fits, while a depressed portion 3d having an oblong cross section is formed on the bottom face of the depressed portion 3c. A plurality of leads 24 are embedded in both side faces perpendicular to the longitudinal direction of the main unit 3. Base end parts of the leads 24 are exposed into the depressed portion 3d while in contact with the bottom face of the depressed portion 3d, whereas their leading end parts extend to the outside of the main unit 3, Thus, the main unit 3 of the spectroscopic module 1 functions as a package in the spectroscope 30.

A depressed portion 3e having an oblong cross section is formed on the bottom face of the depressed portion 3d, while a semispherical depressed portion 3a having a concave curved surface 3b and opening to the front side (one side) is formed on the bottom face of the depressed portion 3e. The curved surface 3b is provided with spectroscopic units 7, 8. A light-transmitting substrate 2 formed into an oblong sheet from light-transmitting glass such as BK7, Pyrex (registered trademark), or silica, light-transmitting molded glass, light-transmitting plastics, or the like is fitted into the depressed portion 3e of the main unit 3 and bonded thereto with a resin or the like.

The bottom face of the main unit 3 is provided with a pair of grooves 29. The grooves 29 are located on both sides of the spectroscopic units 7, 8 in a direction in which the diffraction grating patterns 7a, 8a are arranged, while extending along a direction orthogonal to a direction in which the grooves of the diffraction grating patterns 7a, 8a are arranged. While the grooves 29 are integrally formed with the main unit 3 when forming the latter, sinks occurring during the resin molding of the main unit 3 are mitigated by the pair of grooves 29 in the arrangement direction of the grooves of the diffraction grating patterns 7a, 8a, whereby the positional deviation of the grooves of the diffraction grating patterns 7a, 8a is further suppressed in this direction. When a positional deviation occurs in the grooves of the diffraction grating patterns 7a, 8a with respect to their arrangement direction, the wavelength of light dispersed thereby may shift. Here, the positional deviation in the grooves of the diffraction grating patterns 7a, 8a with respect to their arrangement direction, i.e., spectral light dispersing direction, is suppressed, whereby spectroscopic characteristics can be inhibited from lowering.

A wiring pattern 10 having a plurality of pad units 10a, a plurality of pad units 10b, and a plurality of connection units 10c for connecting the corresponding pad units 10a, 10b to each other is formed on the front face 2a of a light-transmitting substrate 2. The plurality of pad units 10b are arranged so as to correspond to respective base end parts of the leads 24 embedded in the main unit 3. An antireflection layer constituted by a single-layer film of CrO and the like or a multilayer film of Cr—CrO and the like is formed closer to the front face 2a of the substrate 2 than is the wiring pattern 10.

A light-absorbing layer 27 is formed on the front face 2a of the substrate 2. The light-absorbing layer 27 covers the connection units 10c of the wiring pattern 10, while exposing the pad units 10a, 10b of the wiring pattern 10. The light-absorbing layer 27 is provided with openings 27a, 27b, 27c. The opening 27b is located on one side in the longitudinal direction of the substrate 2, while the opening 27c is located on the other side in the longitudinal direction of the substrate 2. The opening 27a is located between the openings 27b, 27c. The opening 27a is a hole through which light Lm incident on the substrate 2 and depressed portion 3a passes. The opening 27b is a hole through which the light L1 dispersed by the spectroscopic unit 7 passes, while the opening 27c is a hole through which the light L3 dispersed by the spectroscopic unit 8 passes. Examples of materials for the light-absorbing layer 27 include black resists, colored resins (such as silicone, epoxy, acrylic, urethane, polyimide, and composite resins) containing fillers (such as carbon and oxides) therein, metals such as Cr and Co or oxides thereof, their multilayer films, and porous ceramics and metals or metal oxides.

An insulating layer 26 is formed between the front face 2a of the substrate 2 and the light-absorbing layer 27. The insulating layer 26 covers the connection units 10c of the wiring pattern 10, while exposing the pad units 10a, 10b of the wiring pattern 10. An insulating part 26a which is a part of the insulating layer 26 covers a part on one side in the longitudinal direction of the substrate 2 within the opening 27b. An insulating part 26b which is a part of the insulating layer 26 covers a part on the other side in the longitudinal direction of the substrate 2 within the opening 27c. The insulating parts 26a, 26b function as optical filters for cutting predetermined wavelength regions of light.

Outer terminals of photodetectors 4, 9 shaped into oblong sheets are connected by facedown bonding through bumps 11 to the pad units 10a exposed from the insulating layer 26 and light-absorbing layer 27. An underfill material 28 which transmits therethrough at least the light L1 fills a space on the substrate 2 side of the photodetector 4 (between the photodetector 4 and the substrate 2, insulating layer 26, or light-absorbing layer 27 here). Similarly, an underfill material 28 which transmits therethrough at least the light L3 fills a space on the substrate 2 side of the photodetector 9 (between the photodetector 9 and the substrate 2, insulating layer 26, or light-absorbing layer 27 here). The underfill material 28 fills the whole space between the photodetector 4, 9 and the substrate 2 in the structure illustrated in FIG. 8, but may fill the surroundings of the bumps 11 alone. The pad units 10b exposed from the insulating layer 26 and light-absorbing layer 27 function as outer terminals. That is, the pad units 10b are wire-bonded by wires 25 to the base end parts of the leads 24, so as to be electrically connected thereto.

In thus constructed spectroscopic module 1, the light Lm incident on the depressed portion 3a through the substrate 2 from the light-transmitting hole 4b of the photodetector 4 and the opening 27a of the light-absorbing layer 27 is dispersed and reflected to the front side by the spectroscopic unit 7. In the light dispersed by the spectroscopic unit 7, the light L1 advances to the front side and is detected by the photodetector 4. In the light dispersed by the spectroscopic unit 7, the light L2 advances to the front side and is reflected to the rear side by the reflection unit 6. The light L2 reflected by the reflection unit 6 is dispersed and reflected to the front side by the spectroscopic unit 8. In the light dispersed by the spectroscopic unit 8, the light L3 advances to the front side and is detected by the photodetector 9. Since the spectroscopic unit 8 and the photodetector 9 are thus provided in addition to the spectroscopic unit 7 and the photodetector 4, the detection sensitivity can be enhanced for light in a wide wavelength range or different wavelength regions of light.

The light-transmitting hole 4b is disposed between the light detecting portions 4a, 9a of the photodetectors 4, 9, while the reflection unit 6 is provided so as to oppose the region R between the light detecting portions 4a, 9a in the light-absorbing layer 27. Thus using the region between the light detecting portions 4a, 9a can prevent the spectroscopic module 1 from becoming larger.

Ambient light La, which is likely to reach the light-transmitting hole 4b and thereabout when the light Lm is made incident on the depressed portion 3a from the light-transmitting hole 4b, is absorbed in the region R in the light-absorbing layer 27. Any part of the ambient light La transmitted through the region R in the light-absorbing layer 27 is reliably reflected to the region R in the light-absorbing layer 27 by the reflection unit 6 disposed so as to oppose the region R in the light-absorbing layer 27 and include the region R1 thereof (region between the photodetectors 4, 9 in the light-absorbing layer 27). This can inhibit stray light from being caused by the incidence of the ambient light La.

Because of the foregoing, the spectroscopic module 1 can accurately detect light in a wide wavelength range or different wavelength regions of light, while being prevented from becoming larger.

The present invention is not limited to the above-mentioned embodiment.

Figure 9:
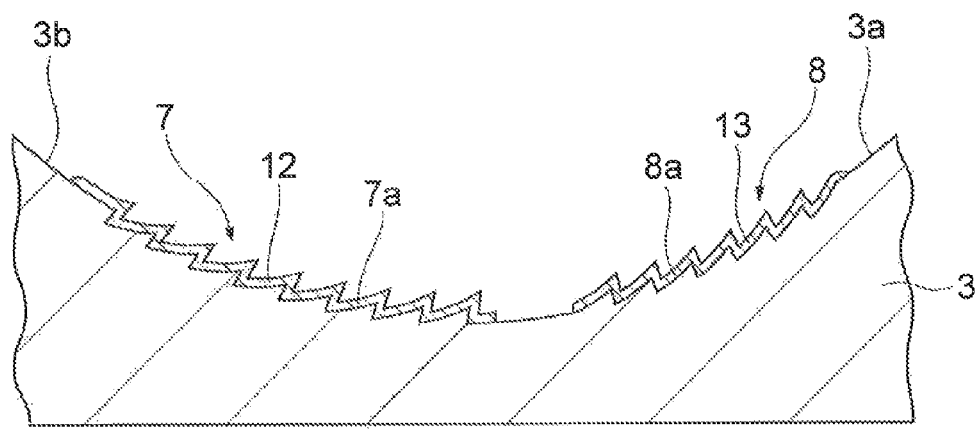
FIG. 9 is a sectional view enlarging a main part of another embodiment of the spectroscopic module in accordance with the present invention.
Figure 9:
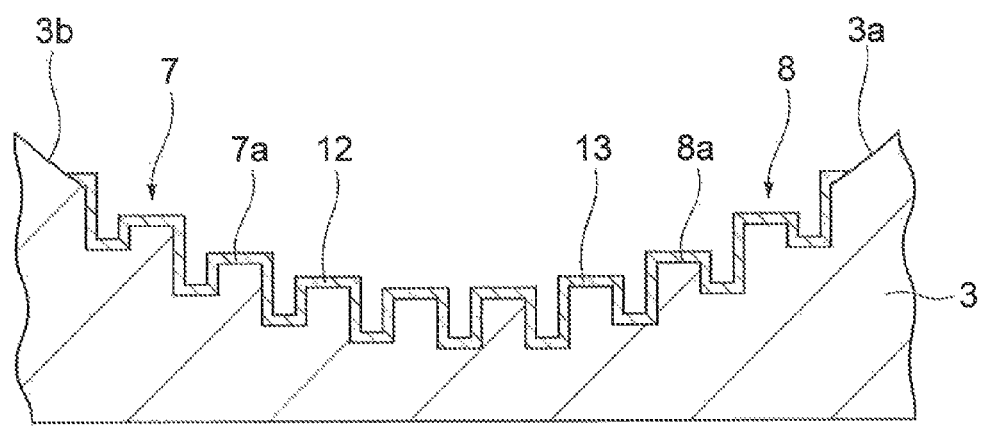

For example, as illustrated in FIG. 9, the diffraction grating patterns 7a, 8a may be formed on the curved surface 3b of the depressed portion 3a of the main unit 3 directly (without providing the diffraction layer 5). The type of the diffraction grating patterns 7, 8 may be a blazed grating having a sawtooth cross section as illustrated in FIG. 9(a), a binary grating having a rectangular cross section as illustrated in FIG. 9(b), or a holographic grating having a sinusoidal cross section.

Without providing the photodetector 4 with the light-transmitting hole 4b, the region R1 in the substrate 2 serving as a light-absorbing layer or the region R1 in the light-absorbing layer 27 may be provided with a light-transmitting hole as a light entrance portion for letting the light Lm into the depressed portion 3a. In terms of the diffraction order to be dealt with by the spectroscopic module, the lights L1, L2 are not limited to the −1st-order and zero-order lights, respectively, as long as their orders differ from each other.

INDUSTRIAL APPLICABILITY

The present invention can provide a spectroscopic module which can accurately detect light in a wide wavelength range or different wavelength regions of light while being prevented from becoming larger in size.

REFERENCE SIGNS LIST

1 . . . spectroscopic module; 2 . . . substrate; 3 . . . main unit; 3a . . . depressed portion; 3b . . . curved surface; 4 . . . photodetector (first photodetector); 4a . . . light detecting portion (first light detecting portion); 4b . . . light-transmitting hole; 6 . . . reflection unit; 7 . . . spectroscopic unit (first spectroscopic unit); 8 . . . spectroscopic unit (second spectroscopic unit); 9 . . . photodetector (second photodetector); 9a . . . light detecting portion (second light detecting portion); R . . . region (region between the first and second light detecting portions); R1 . . . region (region between the first and second light detecting portions); Lm . . . light to be measured; L1 . . . light (first light); L2 . . . light (second light); L3 . . . light (third light)

The invention claimed is:

1. A spectroscopic module comprising:
a main unit provided with a depressed portion having a concave curved surface and opening to one side;
a first reflection layer, formed on the curved surface, for reflecting light incident on the depressed portion to the one side of the main unit;
a second reflection layer for reflecting the light reflected by the first reflection layer;
a third reflection layer, formed on the curved surface, for reflecting the light reflected by the second reflection layer to the one side of the main unit;
a photodetector, supported so as to oppose the curved surface, for detecting the light reflected by the third reflection layer; and
a light entrance portion for letting the light into the depressed portion,
wherein at least the third reflection layer disperses the light reflected by the second reflection layer,
wherein the second reflection layer is located between a light detecting portion of the photodetector and the light entrance portion when seen from the one side of the main unit, and
wherein the second reflection layer and the light detecting portion of the photodetector are provided along a plane perpendicular to an incident direction of light entering into the light entrance portion.

2. A spectroscopic module according to claim 1, wherein each of the second reflection layer and the light detecting portion of the photodetector has a plane shape parallel to each other.

3. A spectroscopic module according to claim 1, wherein the main unit is made of a light-absorbing material.

4. A spectroscopic module according to claim 1, wherein the main unit is provided with a wiring pattern.

5. A spectroscopic module according to claim 4, wherein the photodetector is connected to the wiring pattern of the main unit through bumps.

6. A spectroscopic module according to claim 1, wherein the first reflection layer is provided on a first molded layer.

7. A spectroscopic module according to claim 6, wherein the third reflection layer is provided on a second molded layer.

8. A spectroscopic module according to claim 7, wherein the first molded layer and the second molded layer are continuous with each other.

9. A spectroscopic module according to claim 8, wherein the first reflection layer and the third reflection layer are separated from each other.

10. A spectroscopic module according to claim 1, wherein the first reflection layer and the third reflection layer are separated from each other.

11. A spectroscopic module according to claim 1, wherein the first reflection layer is arranged eccentric with respect to a center of the depressed portion when seen from the one side of the main unit.

12. A spectroscopic module according to claim 11, wherein the third reflection layer is arranged eccentric with respect to the center of the depressed portion toward a side opposite to the first reflection layer when seen from the one side of the main unit.

13. A spectroscopic module according to claim 1, wherein the third reflection layer is arranged eccentric with respect to a center of the depressed portion when seen from the one side of the main unit.

14. A spectroscopic module according to claim 1, wherein the main unit has a pair of recessed portions provided so as to interpose the depressed portion.

* * * * *